June 5, 1951  W. N. GOLDSMITH  2,555,641
VICTIM RESET ANIMAL TRAP
Filed April 24, 1946  2 Sheets-Sheet 1
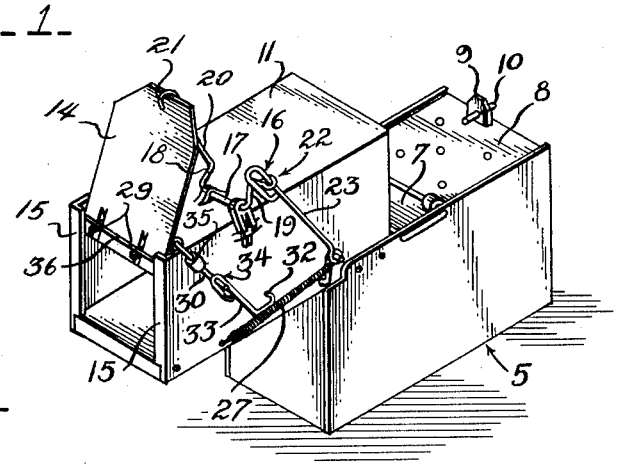
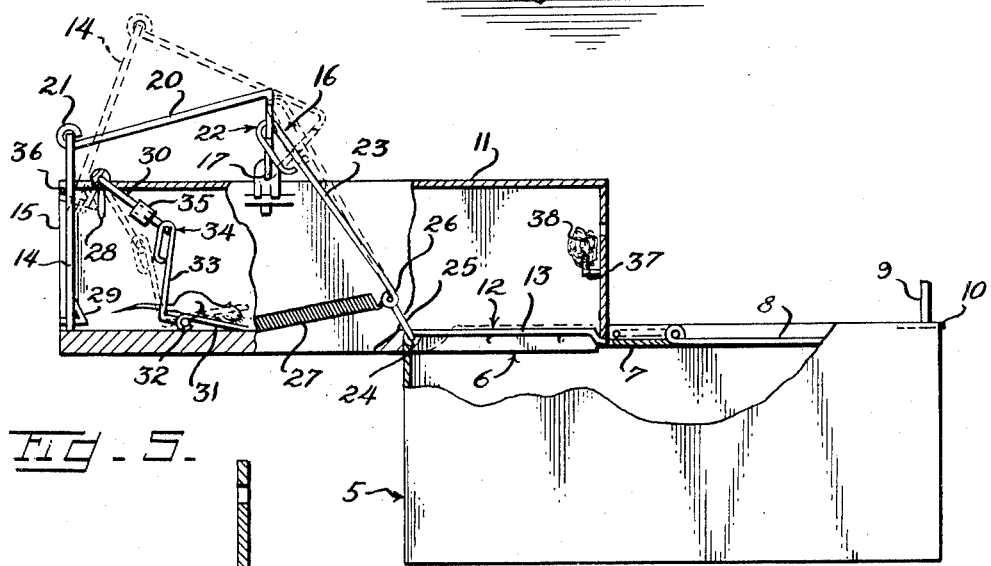
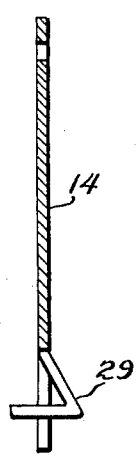
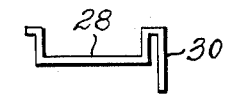
Inventor
Walter N. Goldsmith
By Clarence A. O'Brien
and Harvey B. Jacobson
Attorneys June 5, 1951 W. N. GOLDSMITH 2,555,641
VICTIM RESET ANIMAL TRAP
Filed April 24, 1946 2 Sheets-Sheet 2
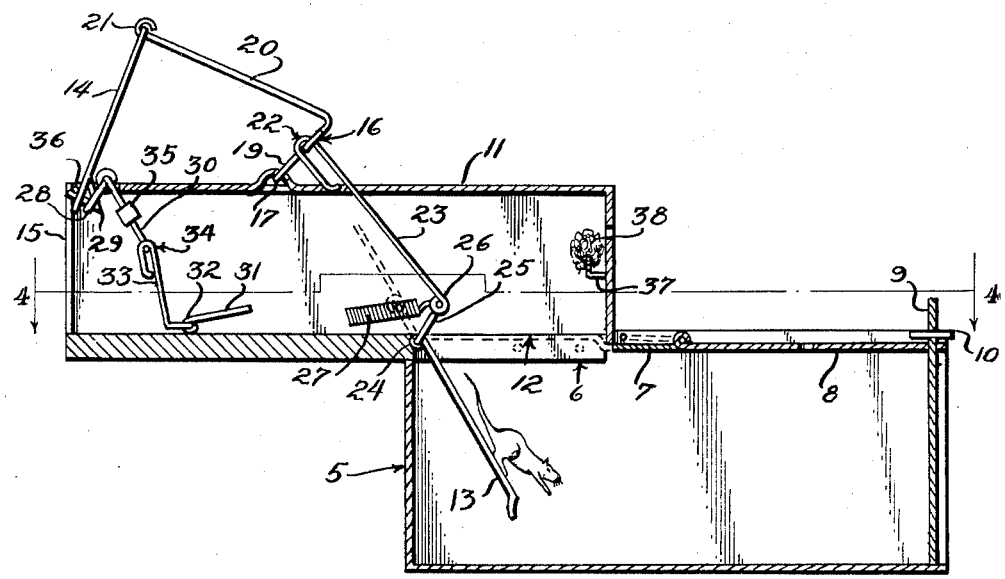
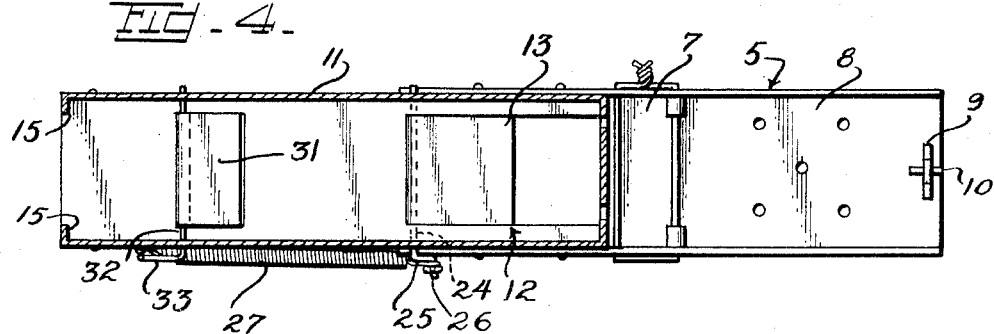
Inventor
Walter N. Goldsmith
By Clarence A. O'Brien
and Harvey B. Jacobson
Attorneys Patented June 5, 1951

2,555,641

UNITED STATES PATENT OFFICE 2,555,641

VICTIM RESET ANIMAL TRAP

Walter N. Goldsmith, Campbell, Mo., assignor of one-fourth to Lula Mae Smith, Cedar Hill, Tenn., and one-fourth to O. N. Redfairn, Campbell, Mo.

Application April 24, 1946, Serial No. 664,606

4 Claims. (Cl. 43—76)

This invention relates to animal traps of the self-setting type embodying a trap chamber, an entrance housing, a normally closed trap door controlling communication between the housing and the chamber, a closure slide for the entrance end of the housing, animal released means for automatically latching the slide in open position, and a lost motion operating connection between the trap door and the slide which permits setting of the slide in open position and gravitation of the same to closed position when the trap door is in closed position, and which causes raising of the slide to open position when the trap door is depressed to opened position.

The present trap is particularly adapted to catching small animals, such as rats and the like, and the primary object of the invention is to provide the trap with improved mechanism whereby the same is automatically set to catch another animal each time an animal is caught therein.

A further object of the invention is to provide a trap of the above kind having its mechanism so constructed and arranged as to involve a minimum number of operative parts and to operate efficiently.

More specific objects and features of the invention will become apparent from the following description when considered in connection with the accompanying drawings, in which:

Figure 1 is a perspective view of an animal trap constructed in accordance with the present invention, the closure slide for the entrance housing being set in open position.

Figure 2 is an enlarged view of the trap shown in Figure 1, partly in side elevation and partly broken away and in section, the closure slide for the entrance housing being in lowered, closed position.

Figure 3 is a view somewhat similar to Figure 2, but with the trap door depressed to the position wherein it has caused the closure slide for the entrance housing to be raised to open position.

Figure 4 is a horizontal section taken substantially on line 4—4 of Figure 3.

Figure 5 is an enlarged vertical sectional view of the closure slide for the entrance housing.

Figure 6 is a fragmentary elevational view of the keeper and its crank arm.

Referring in detail to the drawings, the illustrated embodiment of the invention includes a rectangular box-like trap chamber 5 having an opening at 6 in the forward portion of the top wall 7 thereof and provided with a hinged door 8 in the rear portion of the top wall of the same. The trap chamber 5 is closed at the sides, ends and bottom, as shown, and the rear wall of this trap chamber is provided with an upwardly projecting ear 9 that extends through a slot in the free rear end of the door 8 and is adapted to receive a pin 10 or the like for securing the door 8 in closed position.

An entrance housing 11 is rigidly mounted at its rear portion upon the forward portion of the trap chamber 5 and has an opening in the rear portion in the bottom thereof as at 12, registered with the top opening at 6 of the trap chamber. A hinged trap door 13 is provided for the bottom opening of the entrance housing, and the latter is open at its forward end. A vertically movable closure slide 14 is provided for the forward end of the housing 11, the same being movable behind inwardly projecting flanges 15 provided on the forward ends of the side walls of the housing 11.

A lost motion operating connection 16 is provided between the trap door 13 and the slide 14, which permits setting of the slide 14 in raised open position as shown in Figures 1 and 3 and gravitation of said slide to closed position as shown in Figure 2, when the trap door 13 is in closed position. This lost motion operating connection is also such as to cause raising of the slide 14 to open position when the trap door is depressed to open position. As shown, the operating connection 16 may consist of a rock shaft 17 disposed transversely of and journaled upon the top of the housing 11 and provided at opposite ends with crank arms 18 and 19. The crank arm 18 has a forward extension 20 pivotally attached at 21 at its forward end to the upper end of the slide 14. The crank arm 19 is pivotally and slidably connected at 22 to an elongated loop provided on the upper end of a rearwardly inclined link 23, and the trap door 13 is fixed upon a rock shaft 24 that has a crank arm 25 at one end which is pivoted at 26 to the lower end of the link 23. The pivotal and sliding connection at 22 permits raising of the slide 14 to open position without opening the trap door 13, as well as gravitation of the slide 14 to closed position when the trap door 13 is in closed position. Further, the connection 22 is such that depression of the trap door 13 to open position while the slide 14 is closed, will cause such slide to be raised to open position. Yieldable means, such as a helical tension spring 27 connected to a side of the housing 11 and to the crank arm 25, is provided to normally close the trap door 13.

Means is provided to automatically latch the slide 14 in open position when raised, and this means includes a movable keeper 28 adapted to normally gravitate to latching position. The slide 14 is provided at the bottom with catch lugs 29 that are preferably stamped therefrom so as to project rearwardly and forwardly of said slide 14 as shown clearly in Figure 5. The keeper 28 is disposed directly behind or inwardly of the slide 14 and is adapted to engage beneath the catch lugs 29 when the slide 14 is raised. The keeper 28 is preferably in the form of an elongated U-shaped crank journaled on the underside of the top wall of housing 11 and provided at one end with a rearwardly and downwardly extending crank arm 30. Tiltably mounted upon the bottom of the housing 11 inwardly of the slide 14 is a treadle 31 fixed upon a rock shaft 32 which is provided at one end with an upwardly and forwardly extending crank arm 33 slidably and pivotally connected at 34 to the lower end of the crank arm 30. The arrangement is such that when the animal enters the housing 11 and walks rearwardly along the treadle 31, the latter is depressed so as to swing the keeper 28 to released position and thereby allow the slide 14 to gravitate to lowered closed position. This simply swings the keeper 28 rearwardly from beneath the lugs 29. The crank arm 30 may be weighted as at 35 to cause the keeper 28 to normally swing to its forward latching position as soon as the animal passes rearwardly from the treadle 31, thereby resetting said treadle. The lost motion connection at 34 merely compensates or allows for the change in angular relation between the crank arms 30 and 33 during this operation. Extending across the front opening of housing 11 at the top of said opening is a cross bar 36 disposed in the path of the forwardly projecting ends of the lugs 29 so as to properly limit upward movement of slide 14 to completely open position. Suitable means may be provided on the inner side of the rear wall of housing 11, as at 37, for supporting the bait 38 by means of which the animal is lured into the housing 11 and on to the trap door 13. It will be understood that the spring 27 will be sufficiently weak as to be overcome by the weight of the animal walking onto the trap door 13.

In operation, the slide 14 is set in raised position as shown in Figure 1, the trap door 13 being in its normally closed position. When an animal enters the housing 11 and walks across the treadle 31, the latter is depressed so as to release the keeper 28 and permit the slide 14 to gravitate to closed position, thereby trapping the animal within the entrance housing 11. In attempting to reach the bait 38, the animal will walk on to the trap door 13 and will thereby cause the latter to be depressed so that the animal is catapulted into the trap chamber 5. The trap door is immediately closed by the spring 27, but this is preceded by raising of the slide 14 to open position again upon depression of the trap door 13. Such raising of slide 14 is effected by the operating connection 16 between trap door 13 and slide 14. As soon as the slide 14 is raised, it automatically is latched in such raised position by means of the keeper 28 which has already gravitated to latching position by reason of the animal passing from the treadle 31 on to the trap door 13. The lugs 29 have inclined portions so that they may pass the keeper 28 when the slide 14 moves upwardly, whereupon the keeper 28 immediately gravitates beneath the lugs 29. Thus, the mechanism is such as to automatically reset the trap after each animal is caught in the trap chamber 5, the slide 14 being latched in open position and the treadle 31 returning to raised position ready to be operated for releasing the keeper 28 again.

From the foregoing description, it is believed that the construction, operation and advantages of the present invention will be readily understood by those skilled in the art. Minor changes are contemplated, such as fall within the scope of the invention as claimed.

What I claim is:

1. An animal trap comprising a trap chamber having an opening in the forward portion of the top wall thereof, an entrance housing rigidly mounted upon the trap chamber and having an opening in the rear portion of the bottom wall thereof registered with the top opening of the trap chamber, a hinged trap door for said bottom opening of the entrance housing, said housing being open at its forward end, a vertically movable closure slide for the forward end of said housing, a lost motion operating connection between said trap door and said slide permitting setting of the slide in raised open position and gravitation of the slide to closed position when the trap door is in closed position and causing the raising of the slide to open position when the trap door is depressed to open position, spring means normally swinging said trap door upwardly to closed position, means to automatically latch the slide in open position when raised including a movable keeper pivoted at the top of said housing adjacent its forward end and adapted to normally gravitate to latching position, means to limit raising of the slide, a treadle mounted on the forward portion of the bottom of the housing, and pivotally and slidably connected crank arms on the keeper and the treadle providing an operating connection between said treadle and said keeper whereby depression of the treadle causes release of the keeper to permit gravitation of the slide to closed position.

2. The construction defined in claim 1, wherein the means to automatically latch the slide in open position further includes catches having rearwardly inclined upper portions and horizontal lower portions projecting both rearwardly and forwardly of the slide, said means to limit raising of the slide including a cross bar at the top of the front of the housing engageable with the forwardly extending parts of the lower portions of said catches.

3. The construction defined in claim 1, in combination with a rock shaft carrying said trap door, said lost motion operating connection including a crank arm on said rock shaft, a link pivoted at one end to said crank, a rock shaft journaled on the top of the housing and having crank arms at opposite ends, a lost motion connection between one of the last named crank arms and said link, the other of said last named crank arms having a forward extension pivoted to the top of the slide.

4. The construction defined in claim 1, wherein said keeper comprises an elongated U-shaped crank having a crank arm at one end, a rock shaft carrying the treadle and having a crank arm at one end, and a lost motion connection between said crank arms.

WALTER N. GOLDSMITH.

REFERENCES CITED

The following references are of record in the file of this patent:

UNITED STATES PATENTS

| Number | Name | Date |
|---|---|---|
| 567,201 | Smith | Sept. 8, 1906 |
| 1,245,138 | Zarling | Oct. 30, 1917 |
| 1,392,008 | Fritsch | Sept. 27, 1921 |
| 2,484,452 | Grossi | Oct. 11, 1949 |